March 19, 1957    H. J. BICHSEL    2,786,160
ARC WELDING APPARATUS
Filed May 14, 1954    6 Sheets-Sheet 4

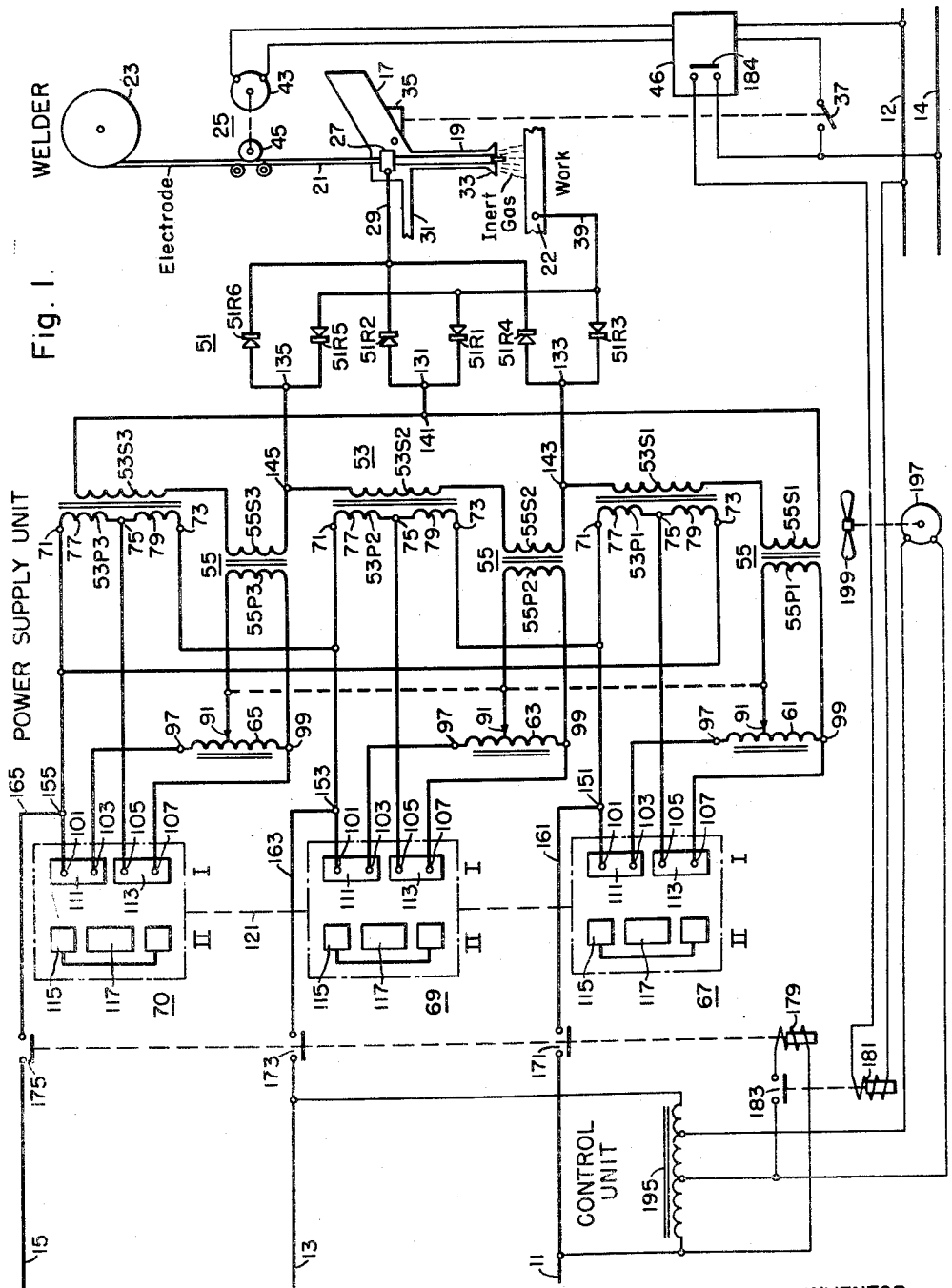

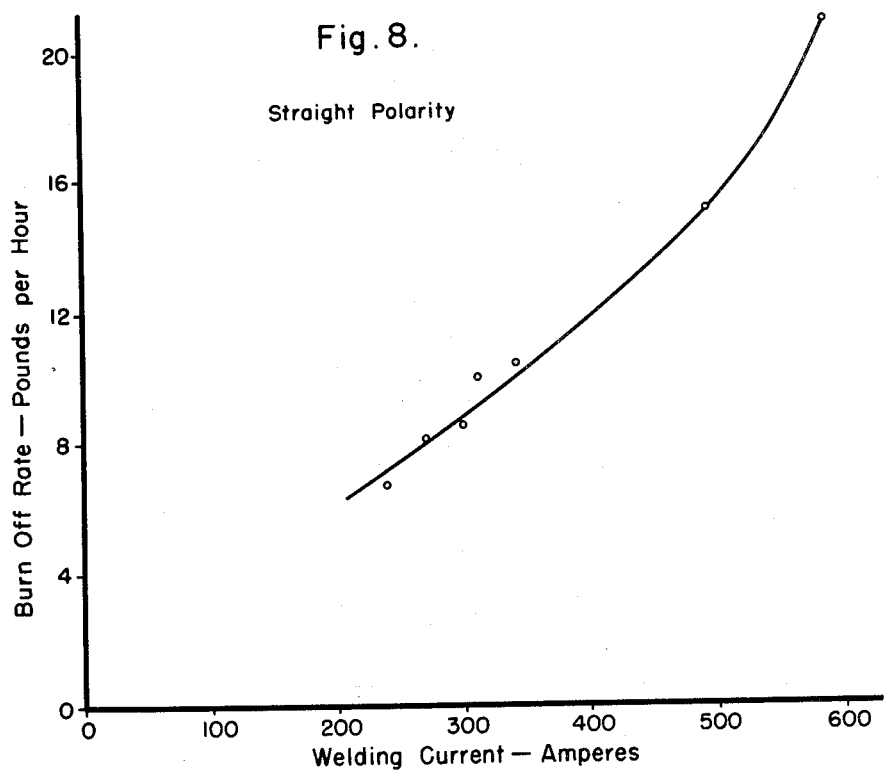
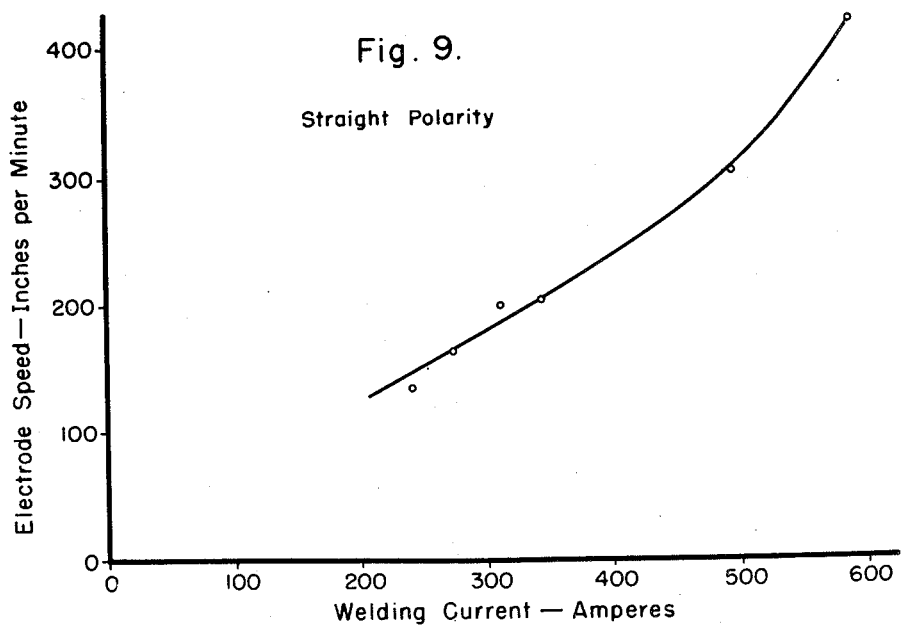

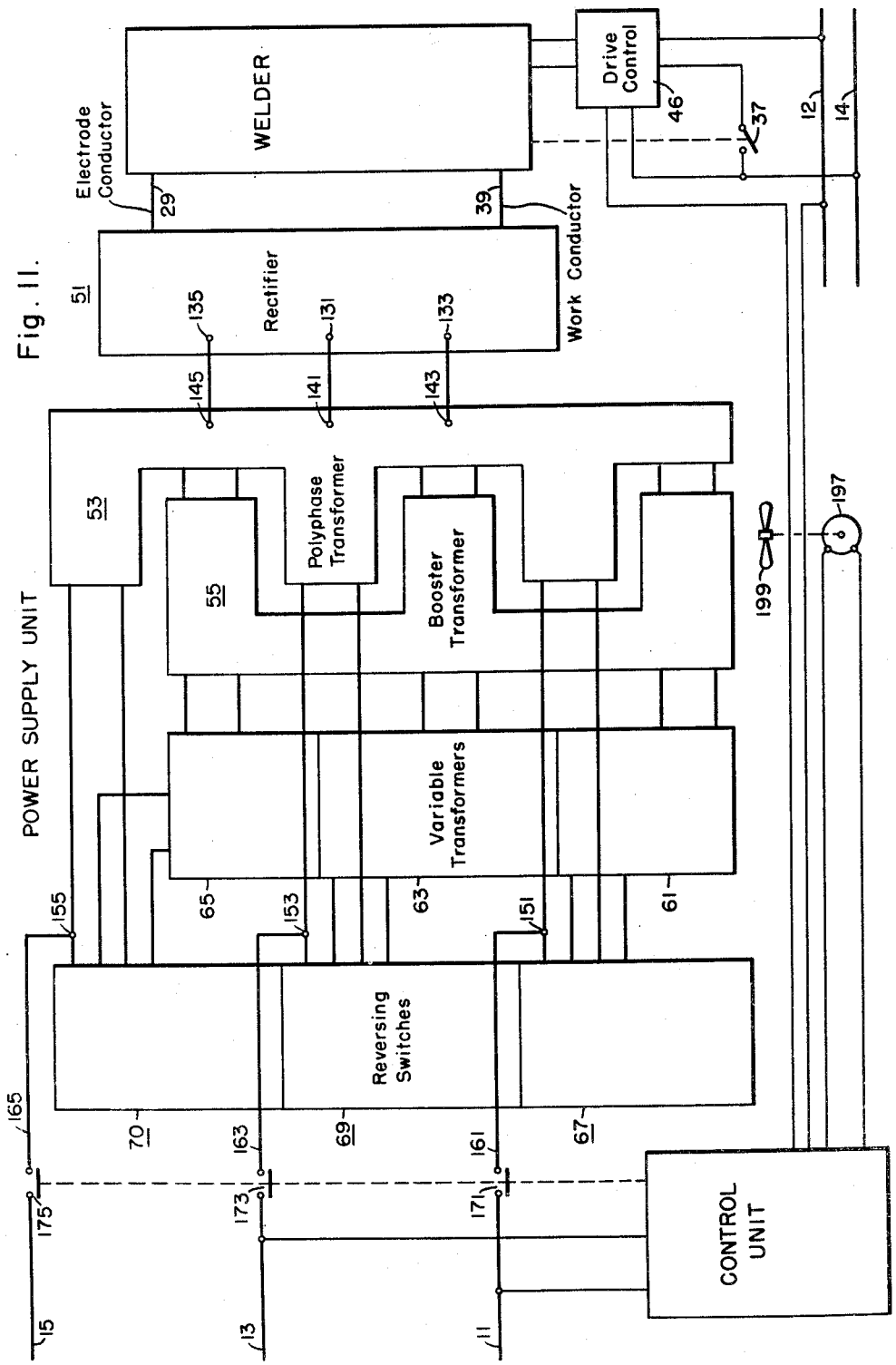

2,786,160

ARC WELDING APPARATUS

Harry J. Bichsel, East Aurora, N. Y., assignor to Westinghouse Electric Corporation, East Pittsburgh, Pa., a corporation of Pennsylvania Application May 14, 1954, Serial No. 429,932

16 Claims. (Cl. 315—141)

My invention relates to arc welding apparatus and has particular relation to apparatus for welding in an inert gas atmosphere.

In arc welding in an inert gas atmosphere with a consumable electrode, it has become the practice to feed and consume the electrode at a high speed which is of the order of several hundred inches per minute for an electrode of the order of 1/8" or 1/16" diameter. The electrode is fed through a gun by a motor which may be adjusted in speed independently of the arc voltage and requires no control responsive to the arc voltage. Because the electrode is fed at a high speed, electrode material becomes available at the arc at a high rate, and any tendency of the arc length to vary may be readily suppressed. It has then become practicable to operate at lower open-circuit voltages than heretofore and in accordance with the teachings of the prior art, low open-circuit voltage apparatus both of the generator and rectifier type has been provided. The generator apparatus is cumbersome and costly. The rectifier apparatus, in accordance with the teachings of the prior art, includes facilities for varying the welding current which is involved and costly.

It is accordingly an object of my invention to provide low-voltage arc-welding apparatus of the rectifier type of relatively simple and low cost structure.

An incidental object of my invention is to provide a rectifier system having facilities of simple and low cost structure for varying the output voltage.

The effectiveness of the operation of the low open circuit voltage welding apparatus just discussed would be enhanced by the facility of the apparatus to adjust itself electrically to variations of the feed speed of the electrode, that is, of the rate of deposit of electrode material so that the arc length remains constant. This is particularly desirable where the operation is to be automatic or semi-automatic. Now the arc voltage varies directly with the arc length becoming greater as the arc length increases and smaller as the arc length decreases. This variation of arc voltage itself militates against constant arc length since in itself (without any change in current) it would tend, subject to radiation losses, to cause the arc length to increase further once it starts to increase, or to decrease further once it starts to decrease. A compensating change in current to counteract this effect is desirable and, within reasonable limits, it is desirable that this compensating effect be large. Thus, it is desirable that an increase in arc voltage be accompanied by a large decrease in welding current and a decrease in arc voltage be accompanied by a large increase in welding current.

A more specific object of my invention then is to provide low voltage arc-welding apparatus having a characteristic such that a small change in arc voltage is accompanied by very large change in welding current, and a large change in welding current is accompanied by a small change in arc voltage.

In accordance with the specific aspects of my invention, I provide direct current arc-welding apparatus which is energized from a polyphase source and the voltage of which is controlled by variable transformers capable of introducing voltage increments variable continuously from a minimum to a maximum. This apparatus includes a polyphase transformer having secondary phase windings in series with each of which a secondary winding of a booster transformer is connected. Each of these networks consisting of a secondary phase winding and a secondary booster winding in series is connected to a terminal of the rectifier. The primary phase windings each supply a primary winding of a booster transformer through a reversing switch and one of the variable transformers. The potential available at the output terminals of the rectifier is dependent on the algebraic sum of the potential delivered by the secondary phase windings and the secondary windings of the booster transformer. The secondary potential of each of the booster transformers is determined by the settings of the associated variable transformer and associated reversing switch. With the reversing switch in one position, the secondary potential of the booster transformer is added to the secondary potential of the associated secondary phase winding, and with the reversing switch in the opposite position, the secondary potential of the booster transformer is subtracted from the associated secondary phase potential. Thus a wide range of voltage variable in small increments is available for welding. In addition, the voltage is variable continuously over the whole range without disconnecting the welding electrode and the work from the supply; that is, the voltage may be varied over the whole range by the operator while he is welding. For example, starting with the variable transformers and switches set so that the voltage is a maximum, the variable transformers may be varied until their voltage is zero; at this point the switches may be actuated without affecting the voltage between the electrode and the work because the potential outputs of the variable transformers are zero; thereafter the variable transformers may be again varied until their voltages are a maximum and the voltage between the electrode and the work is a minimum.

It is an important feature of the power supply unit consisting of the supply transformer, the variable transformers and booster transformer that it is of very low impedance, the ratio of open circuit primary current to short circuit primary current being preferably less than 1/10. It is because of this feature that the characteristic was described above, such that a small change in arc voltage is accompanied by a large change in welding current.

Specifically, for a low-voltage arc welder in accordance with my invention, I provide a polyphase transformer, each of the secondary phase windings of which is capable of delivering an open-circuit voltage of the order of 21 volts R. M. S. when energized from a commercial supply of 220 or 440 volts, and a booster-transformer variable transformer combination which is capable of delivering an open-circuit voltage from zero to 10 volts R. M. S. across the secondaries of the booster transformer as the voltage across the primaries is varied from zero to 220 volts. Each of the networks, including a secondary phase winding and a secondary booster winding, is thus capable of delivering between 11 volts and 31 volts R. M. S. depending on the setting of the associated variable transformer and reversing switch. This voltage makes available at the output terminals of the rectifier an open-circuit voltage range of between 15 and 40 volts. I thus provide an arc welder including facilities for impressing a potential continuously variable of between 15 and 40 volts between the electrode and the work.

The novel features that I consider characteristic of my invention are set forth generally above. The invention itself both as to its organization and its method of operation together with additional objects and advantages thereof will be understood from the following description of specific embodiments when read in connection with the accompanying drawings, in which:

Figure 1 is a circuit diagram of a preferred embodiment of my invention;

Figs. 8 and 9 are graphs showing the burn off rate and the electrode feed speed respectively as a function of the current for the embodiment shown in Fig. 1;

Fig. 11 is a block diagram showing the important parts of the apparatus shown in Figs. 1 through 3.

Figure 3:
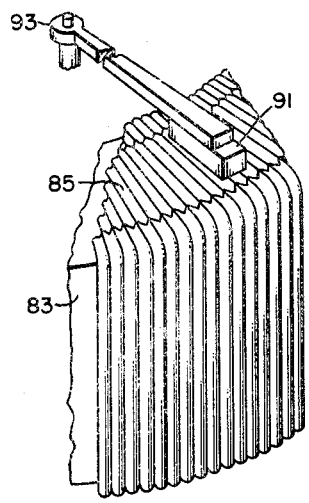
Fig. 3 is a fragmentary view showing the important features of the variable transformer used in the practice of my invention.

The apparatus shown in Figs. 1 through 3 and 11 includes a Welder, a Power Supply Unit and a Control Unit. The main power supply for this apparatus are the power supply buses or conductors 11, 13 and 15 which may be connected to a three-phase supply of the commercial 60 cycle type. Usually, the power available at the conductors is at a voltage of 220 or 440, and the apparatus, in accordance with my invention, is adapted to operate at either of these voltages. In addition, power for certain control functions is derived from auxiliary buses or conductors 12 and 14 which are usually of the 110 volt 60 cycle type.

Since my invention is not in any way tied up with the mechanincal details of a welder, the Welder shown in Fig. 1 is of purely rudimentary structure. This Welder includes a gun 17 having a channel 19 through which a welding electrode 21 may be transmitted towards work 22 to be welded, a reel 23 from which the electrode 21 is derived and a drive 25 for the electrode 21. The channel 19 is provided with a brush 27 or other contact means for connecting the welding electrode 21 to the electrode conductor 29 of the power supply unit. The gun 17 also includes an inlet tube 31 through which inert gas is supplied to the channel 19. The channel 19 terminates in a nozzle 33 beyond which the melting tip of the electrode 21 extends during a welding operation, and at this time the inert gas supplied through the inlet 31 passes through the nozzle and envelops the welding electrode and the adjacent work 22 within an atmosphere within which the arc may be ignited and may operate at a low voltage. The gun 19 also includes a trigger 35 which may be actuated by the operator to close a switch 37 within the gun. The work 22 is connected to the work conductor 39 of the Power Supply Unit.

The drive 25 may be of any suitable type. It is shown symbolically as including a drive motor 43 and rolls 45 for advancing the electrode 21. The motor is supplied through a drive control 46 which is energized from the auxiliary conductors 12 and 14 through the trigger switch 37. The structure of the drive control 46 does not concern my invention and is not described in detail. Generally it includes facilities for starting and stopping the motor 43 and in addition for controlling its speed so that the rate of feed of the electrode 21 may be controlled.

The Power Supply Unit includes a rectifier 51, a polyphase transformer 53, a polyphase booster transformer 55, a plurality of variable transformers 61, 63 and 65, one for each phase of the polyphase transformer and a plurality of reversing switches 67, 69 and 70, one for each phase of the polyphase transformer. The polyphase transformer 53 is constructed to be supplied with from 220 volts or from 440 volts. It has a plurality of primary phase windings 53P1, 53P2, 53P3. Each primary phase winding has terminal taps 71 and 73 and an intermediate tap 75 which divides each phase winding into two sections 77 and 79. When the apparatus is energized from a 440 volt supply, the sections 77 and 79 of each primary phase winding are connected in series and each section 77 and 79 may be regarded as the secondary of an auto-transformer from which 220 volts may be derived with 440 volts across the primary. When the apparatus is energized from a 220 volt supply, the sections 77 and 79 are connected in parallel. The polyphase transformer 53 also has a plurality of secondary windings 53S1, 53S2 and 53S3. The polyphase transformer 53 is of low impedance. The booster transformer 55 is of low impedance and has primary windings 55P1, 55P2, 55P3 and secondary windings 55S1, 55S2, 55S3.

Each of the variable transformers 61, 63, 65 is of the type sold in the trade under the names of Variac or Powerstat variable transformer. This variable transformer is of low impedance and its important features in addition to the low impedance, as far as my invention is concerned are shown in Fig. 3. As shown, the variable transformer is composed of a large number of closely spaced but insulated turns 81 wound on a toroidal core 83. Each of the turns 81 is of circular form with the portions of the turns 85 on the upper face of the toroidal core 83 flattened and free of insulation, and a conductive slider 91 which is connected to an axial shaft 93 and is movable by rotation of the shaft engages the insulation-free turns 85. The variable transformer has a pair of end terminals 97 and 99 between which all of the turns 81 are preferably included. As the slider 91 is moved from one end terminal, say 97, to the other, 99, it changes the number of turns 81 between it and both of the terminals. Because the turns 81 are closely spaced and because the slider 91 engages a number of the turns, the number of turns between the slider and each of the terminals 97 and 99 is variable, not in steps, but for all practical purposes continuously, from a low magnitude to a high magnitude with reference to one of the terminals, and from a high magnitude to a low magnitude with reference to the other terminal. Thus, the ratio of the number of turns between the fixed terminals 97 and 99 of the variable transformer and the turns between the slider 91 and either of the terminals is continuously variable, and the voltage available from the variable transformer is continuously variable. The slider 91 of the variable transformers 61, 63, 65 are ganged so that the variable transformers may be set as a unit.

While the component (61, 63, 65) just described, which is preferred in accordance with the specific aspects of my invention, is designated in the art as a variable transformer, it may be regarded as a variable inductive reactance or a variable impedance somewhat similar to a voltage divider. In referring to a variable transformer herein and in the claims, I intend to include within the broad scope of my invention the component of the type disclosed or a similar low impedance component for performing the same function as the variable transformer, that is, for supplying to the booster transformer a voltage capable of continuous, as distinct from step adjustment, regardless of what such component may be called or of the specific character of its structure.

Each of the reversing switches may be of any well-known type and is shown symbolically as in the form of a drum having a plurality of fixed contacts 101, 103, 105 and 107 and cooperative sets of movable contacts 111 and 113 and 115 and 117. Each switch has two positions, a first position I in which the movable contacts 111 and 113 are connected to the fixed contacts 101 through 107 and a second position II in which the other movable contacts 115 and 117 are connected to the fixed contacts. The relationship of the fixed contacts in position I is electrically reversed to its relationship in position II. The actuating mechanisms of the switches 67, 69, 70 represented symbolically by the line 121 are ganged so that the switches are actuable together.

The rectifier 51 consists of a plurality of pairs of units 51R1, 51R2, 51R3, 51R4, 51R5, 51R6; each pair being associated with a phase of the transformer. The anode of one rectifier 51R2, 51R4, 51R6 of each pair and the cathode of the other 51R1, 51R3, 51R5 are connected together to form junctions 131, 133 and 135 respectively. The cathodes of the former rectifiers 51R2, 51R4, 51R6 of three pairs are connected to conductor 29 and the anodes of the latter rectifiers 51R1, 51R3, 51R5 of the three pairs are connected to conductor 39.

In the preferred practice of my invention, the secondary phase windings 53S1, 53S2, 53S3 of the transformer 53 are connected each in series with an associated booster secondary winding 55S1, 55S2, 55S3, and each of these latter series networks are connected in series into a polygonal or delta network. The apices 141, 143 and 145 of the delta are connected respectively to the junctions 131, 133 and 135. When the transformers 53 and 55 are energized, positive current may thus be conducted to conductor 29 from apices 141, 143, 145 and from conductor 39 to the apices. By positive current, I mean the flow of positive ions or holes, as they are called in the art, as distinct from electrons. While in the apparatus shown in Figs. 1 and 2, the electrode conductor 29 is thus of positive polarity relative to the work conductor 39, in the practice of my invention, the connections may be reversed and frequently are so that the welding electrode is electrically negative and the work positive.

In the preferred practice of my invention the primary phase windings 53P1, 53P2 and 52P3 are connected in a polygonal or delta configuration having apices 151, 153 and 155. Input supply conductors 161, 163 and 165 are connected respectively to the apices 151, 153, 155.

The terminal connections 97 and 99 of each of the variable transformers 61, 63, 65 are connected through the associated reversing switch 67, 69 and 70 respectively across a section 77 of the associated primary phase winding 53P1, 53P2, 53P3 respectively. For this purpose, the terminal connections 97 and 99 of each variable transformer are connected respectively to fixed contacts 103 and 107 of the associated reversing switch, and the intermediate tap 75 and one of the terminal taps 71 of the associated phase winding are connected to fixed taps 105 and 101 respectively. When the reversing switches are in position I, the left-hand terminals 97 of the variable transformers are connected to the terminal taps 71 of the secondary phase windings and the right-hand terminals 99 of the variable transformers are connected to the intermediate taps 75 of the phase windings; when the switches are in position II, the left-hand terminals 99 of the variable transformers are connected to the intermediate tap 75 of the primary phase windings and the right-hand terminals 97 of the variable transformers are connected to the terminal taps 71 of the primary phase winding. The adjustable slider 91 of each of the variable transformers 61, 63, 65 and one of the terminal taps 99 are connected respectively across associated primaries 55P1, 55P2, 55P3 respectively of the booster transformer 55.

In the preferred practice of my invention, the windings of the polyphase transformer 53 are so related that of the order of 21 volts R. M. S. appears across each of the secondary phase windings 53S1, 53S2, 53S3 when 220 or 440 volts is impressed across the primary phase windings 53P1, 53P2, 53P3 properly connected, and the windings of the booster transformer 55 are so related that when the associated variable transformer 61, 63, 65 is in the position to deliver the maximum voltage, that is 220 volts R. M. S., the potential which appears across each secondary is of the order of 10 volts R. M. S. Thus, the R. M. S. potential across each of the networks consisting of a secondary phase winding 53S1, S2, S3 and the associated secondary winding 55S1, 55S2, 55S3 of the booster transformer may, depending on the position of the associated reversing switch 67, 69, 70 be either 11 or 31 with each variable transformer in the position to deliver the maximum voltage. This voltage may be varied substantially continuously from 11 volts to 31 volts or in the opposite sense as the setting of the associated variable transformer is changed. The corresponding direct current voltages which are impressed between the electrode conductor and the work conductor vary from 15 volts to 40 volts. This voltage is adequate to fire and maintain an arc between an electrode and work in an inert gas atmosphere when the electrode material is supplied at a speed of several inches per minute.

The Control Unit includes a plurality of normally open contacts 171, 173 and 175 actuable by a solenoid 179. The contacts 171, 173, 177, when closed, connect the input conductors 161, 163, 165 of the Power Supply Unit to the power supply buses 11, 13 and 15 respectively. The Control Unit also includes a relay 181 having a normally open contact 183. The normally open contact 183 is connected in series with the solenoid 179 across supply conductors 11 and 13. The coil of the relay 181 is actuated by the closing of a contact 184 in the drive control 46 when the latter is energized. The Control Unit further includes an autotransformer 195 energized from the two conductors 11 and 13 which supplies a motor 197 for actuating a cooling fan 199.

The Power Supply Unit and the Control Unit of apparatus which I have constructed and found to operate satisfactorily includes the following components:

Rectifier 51—Each unit 51R1 through 51R6 consists of 20 single cells in parallel. The cells are Westinghouse selenium rectifiers Style No. 1775700.

Transformer 53—Consists of a three-legged core formed by a 3⅜″ stack of Westinghouse Style Nos. 1458861 and 1458106 punchings interleaved, on each leg of which a primary phase winding coil (53P1, 53P2, 53P3) and a secondary phase winding coil (53S1, 53S2, 53S3) are mounted. The primary coils are next to the associated legs and the secondary coils encircle the associated primary coils. Each primary phase winding coil has 250 turns of .081″ diameter copper wire of circular section, is 6½″ in diameter and 4⅛″ long. Each secondary phase winding coil has 12 turns produced by winding four parallel copper conductors of .114″ by .182″ dimensions, is 7¾″ in diameter and is 4¾″ long. The impedance of the transformer 53 defined as the ratio of the primary current with the secondary at open circuit to the primary current with the secondary at short circuit multiplied by 100, is 6.1%.

Transformer 55—Consists of a three-legged core formed by a 2⅝″ stack of Westinghouse punchings Style Nos. 1499283 and 1499284 interleaved, on each leg of which a primary winding coil (55P1, 55P2, 55P3) and a secondary winding coil (55S1, 55S2, 55S3) are mounted. The primary coils are next to the associated core legs and the secondaries encircle the associated primaries.

Each primary coil has 176 turns of .064″ diameter copper wire of circular section, is 4⅜″ in diameter and 3⅜″ long. Each secondary coil has 8 turns produced by winding four parallel copper conductors of rectangular section of .114″ by .182″ dimensions, is 6″ in diameter and 4³⁄₁₆″ long. The impedance of this transformer 55 is about 5%.

Variable transformers 61, 63, 65—Each is catalogue No. 1226–L3E Powerstat transformer made by Superior Electronic Co. of 3 Clarke Avenue, Bristol, Connecticut.

Reversing switch 67, 69, 70—Allen-Bradley size oo transfer switch, style B, form 6PDT, 2 position, Bulletin 806, rated 10 amperes and 280 volts.

Contactors 171, 173, 175—Westinghouse NS contactor size 2 Style No. 1577306.

Relay 181—Potter-Brumfield MR1A with 115 volt 60 cycle coil.

In the standby condition of the apparatus, the switches or circuit breakers (not shown) to the supply conductors 11, 13 and 15 are closed and the supply conductors are energized. The fan motor 197 is thus energized actuating the cooling fan 199. In addition, power is available between the conductors 11 and 13 across which the solenoid 179 is adapted to be connected and also between the conductors 12 and 14.

When a weld is to be made with the apparatus, the electrode 21 is passed through the gun 17 so that its end projects through the nozzle 33. The gun 17 is then held in the hand and the trigger 35 compressed. A circuit is thus closed through the coil of the relay 181 actuating the relay. The normally open contact 183 of the relay closes the circuit through the solenoid 179 actuating the contacts 171, 173, 175 so that power is impressed at the terminals of the delta network of the primary phase windings 53P1, 53P2, 53P3.

Power is now available between the welding electrode 21 which is connected to the electrode conductor 29 and the work 22. In addition at this time the gas valve (not shown) is opened and gas flows to blanket the electrode and work in an atmosphere of inert gas. The operator now touches the electrode to the work and the electrode vaporizes and an arc is struck between the electrode and the work, the drive motor 45 for the electrode 21 is actuated and the welding may proceed.

The manner in which the apparatus in accordance with my invention operates is illustrated by the graphs presented in Figs. 5 through 10. The data on which these graphs are based was derived from measurements taken while producing sound welds with ordinary hot rolled steel work and a ferrous electrode having a diameter of $\frac{1}{16}''$ coated with an arc stabilizing oxygen containing material, the electrode being of the type disclosed in a copending application Serial No. 432,958, filed May 28, 1954, to Julius Heuschkel and Howard C. Ludwig and assigned to Westinghouse Electric Corporation.

Figure 5:
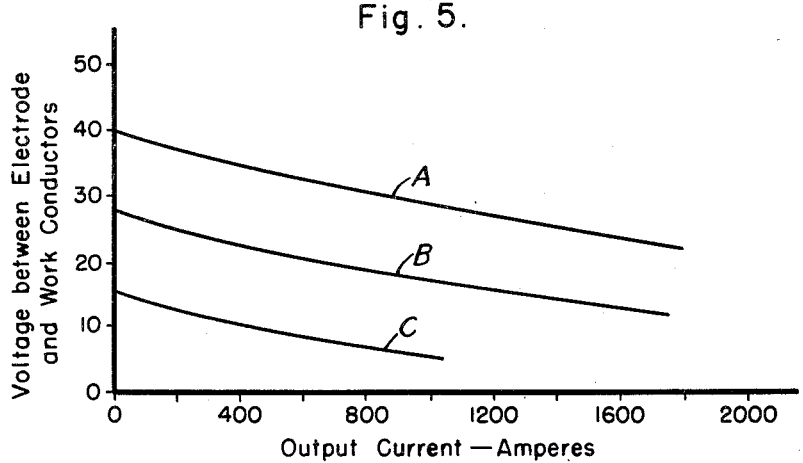
Fig. 5 is a graph showing volt-ampere characteristics of a tube embodiment of my invention shown in Fig. 1.

Fig. 5 presents the voltage-current characteristic of my apparatus at three different settings of the variable transformers 61, 63, 65 and reversing switches 67, 69, 70. Voltage is plotted vertically and current horizontally. Curve A corresponds to a setting for an open circuit voltage of 40 between the electrode conductor 29 and the work conductor 39, curve B to a setting for an open circuit voltage of 27.5 volts, and curve C to an open circuit voltage of 15 volts. In deriving the data for curves A, B, and C the apparatus was set at each of the respective open-circuit voltages and the voltage and current measured for different resistance between the electrode conductor 29 and the work conductor 39. It is seen that at each setting the change in current for a change in voltage is large. Thus in the neighborhood of 500 amperes at which the apparatus is designed to operate continuously a change of 100 amperes corresponds to a change of only one volt. It is seen that under such circumstances the facility for setting the voltage continuously over the range is desirable.

Figure 6:
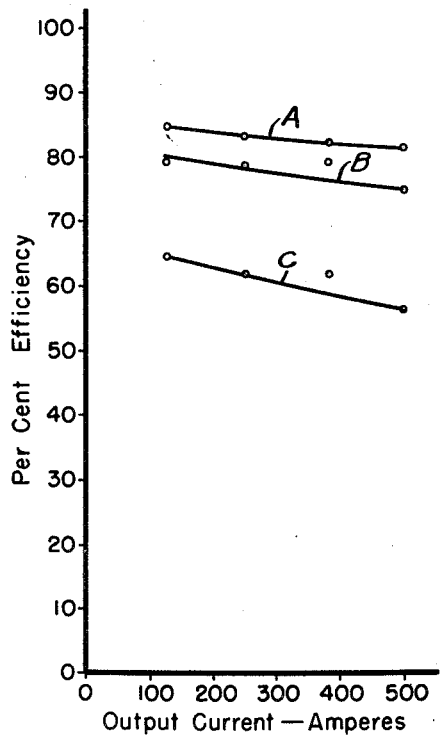
Figs. 6 and 7 are graphs showing the efficiency and the power factor respectively of the embodiment shown in Fig. 1 as a function of the current for the characteristics shown in Fig. 5.

Fig. 6 presents the efficiency of my apparatus as a function of current for the situations represented by the graphs A, B and C of Fig. 5. Efficiency in percent is plotted vertically and current horizontally. The graphs of Fig. 6 are labeled to correspond to Fig. 5. It is seen that the efficiency increases materially with the open circuit voltage.

Figure 7:
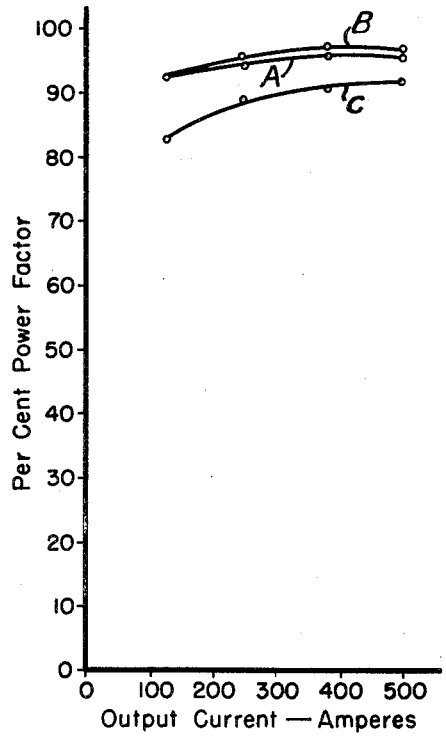

Fig. 7 presents the power factor of my apparatus as a function of current for the three situations in Fig. 5. In this case power factor in percent is plotted vertically and current horizontally. The power factor seems to be a maximum for the intermediate open circuit voltage.

Figs. 8 and 9 show how the burn-off or melting rate of the electrode in the practice of my invention and the feed speed of the electrode vary with welding current. In Fig. 8 burn-off rate in pounds per hour is plotted vertically and current horizontally and in Fig. 9 electrode speed in inches for a minute is plotted vertically and current horizontally. It is seen that as the burn-off rate or feed speed increase the welding current also increases. Thus with the burn-off rate at 300 inches per minute the welding current is about 480 amperes and with the rate 400 inches per minute the current is 570 amperes. It appears then that as the setting of the control 46 is changed for different electrode feed speeds the welding current is changed materially.

Now there is a relationship between welding current or arc current and arc voltage which must be maintained to maintain normal welding. If for any open-circuit voltage setting of the apparatus the current becomes so small as to fail to satisfy the relationship the arc is interrupted and if the current becomes so high as to fail to satisfy the relationship stubbing takes place. Stubbing is defined as the condition in welding when the electrode is near the work and the current is just too low so that the electrode touches the work intermittently.

Figure 10:
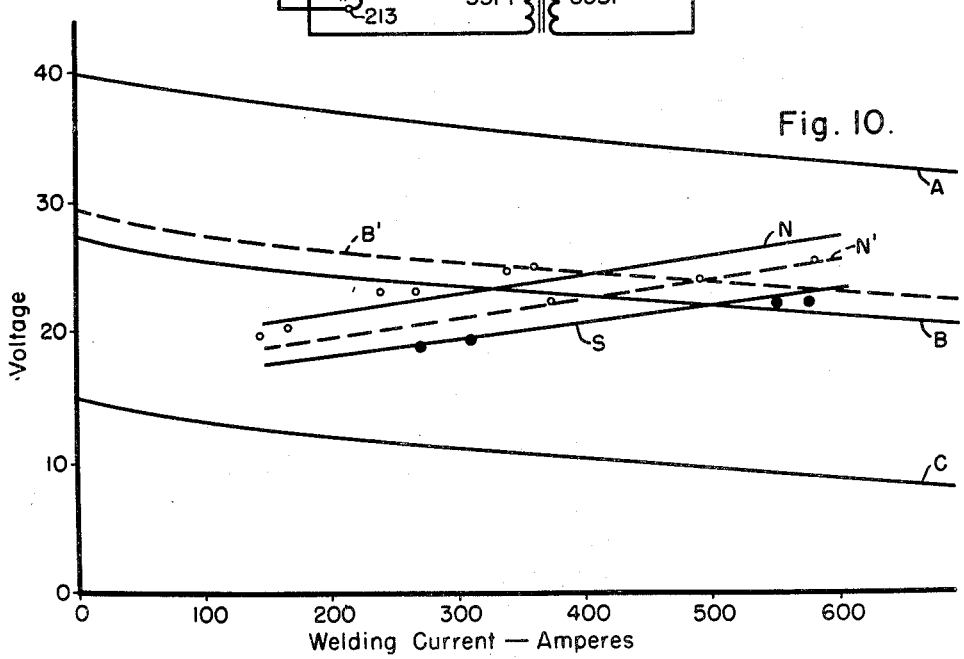
Fig. 10 is a graph showing the relationship between the volt-ampere characteristic and the volt-ampere characteristics of the arc.

The relationship between arc current and arc voltage which must be maintained and the manner in which it is maintained may be understood by comparing the arc voltage-current characteristic for given arc lengths with the apparatus voltage-current characteristic and a comparison as presented in Fig. 10. In this case the voltage between electrode conductor 29 and the work conductor 39 is plotted vertically and current horizontally. The apparatus characteristic is represented by the curves A, B, C, which are the same as the similarly labeled curves of Fig. 5. Two arc characteristic curves are presented, the upper, labeled N, corresponding to normal welding; the lower labeled S corresponding to the limiting condition in which stubbing occurs. The data for curves N and S was derived by setting the apparatus at different open circuit voltages and at each voltage first welding normally at a given arc length and measuring the current and then decreasing the arc length until stubbing occurred and measuring properties and at least in part on the properties of the material being welded. In the case at hand the curves N and S are for the coated ferrous electrode described above.

The curves A, B, C and N, S are representative of families of curves corresponding to different settings of the variable transformers and electrode feed speed. Each welding operation is represented by curve such as B and a curve such as NA and the point of operation is of their intersection. During any welding operation the settings must be so coordinated that in spite of the usual fluctuation of the welding current and supply voltage the welding proceeds without stubbing or without arc outages. For any set of curves N and S then the open circuit voltage must be so selected that the corresponding apparatus characteristic curve intersects curve N in the region of a current magnitude at which the apparatus is designed to operate. Thus for the curves N and S, the open circuit voltage should be such as to correspond to a family of curves in the region of curve B; if it corresponds to curves A or C the apparatus will fail to weld properly.

For a better understanding of the operation assume that the variable transformers and the electrode feed speed are set to correspond to the curves B and N. The voltage and current in the region of which the operation takes place is at this setting given by the intersection of these curves; that is, the voltage is 23.5 and the current 324 amperes. The corresponding feed speed (Fig. 9) is 195 inches per minute. Now assume that the feed speed is increased to 250 inches per minute. This results in an increase in current 414 amperes. By increasing the electrode feed speed the arc length has been decreased.

The operation is then along another curve of the family N which has a point having an abscissa of 414 amperes. It is seen that this point lies on curve B at an ordinate of about 22.8 volts. The new N curve N' must pass through this point. Thus a curve of the family, N', approximately parallel to N and S is defined. Since this curve is above S the welding at the new speed will probably proceed normally. But to assure stability it may be desirable to raise the open circuit voltage slightly thus raising the B curve so that approximately the original N curve defines the operation. A new curve B' is thus obtained.

It is seen that to achieve the desired control of feed speed and arc voltage the flexibility of control afforded by the apparatus in accordance with my invention is essential. The variable transformers 61, 63, 65 afford facilities to enable the operator to adjust precisely the open circuit voltage available between the electrode and the work, and thus to coordinate the arc voltage with the current at which the welding takes place which is in turn dependent in the rate at which the electrode is supplied.

The booster transformer 55 is wound to reduce a potential of 220 volts to approximately 10 volts. The relationship between the secondary 55S1, 55S2, 55S3 and the primary 55P1, 55P2, 55P3 of the windings of the booster transformer is thus, in effect, that which exists between a conductor and the windings of a current transformer coupled to the conductor. This relationship is of particular importance when the variable transformers 61, 63, 65 are set in the position in which the potential delivered by them is zero. In this case, a high potential can be induced from a secondary winding of the booster transformer into a primary winding when welding current or short circuit current flows through the primary network or the primary circuit is open. Under the circumstances, it is essential that the sliders 91 be constructed sufficiently massive to conduct the current which thus flows.

Within the broad aspects of my invention, the reversing switches 67, 69, 70 could in each case be connected between a variable transformer 61, 63, 65 and the primary 55P1, 55P2, 55P3 of the booster transformer rather than between each of the primary phase windings and a variable transformer, but such a connection is not to be preferred. With the switch connected between the variable transformers and the primaries of the booster transformer, the contacts of the switches would be subjected to high potential by actuation when current is flowing in the welding circuit by reason of the current transformer effect just described. Such high potential would cause arcing at the contacts, would seriously damage the switch and may also cause short circuiting of the power supply.

With the switches 67, 69, 70 connected as shown in Fig. 1 the welding voltage may be varied under load from the minimum magnitude to the maximum magnitude, without damage to the switches or to any other parts, by moving the taps 91 of the variable transformers 61, 63, 65 from maximum to zero output and reversing the switches at zero output. Thus an operator may set the voltage at precisely the proper magnitude as he is welding; he need not guess at the setting and then weld to determine if his guess is correct.

Figure 2:
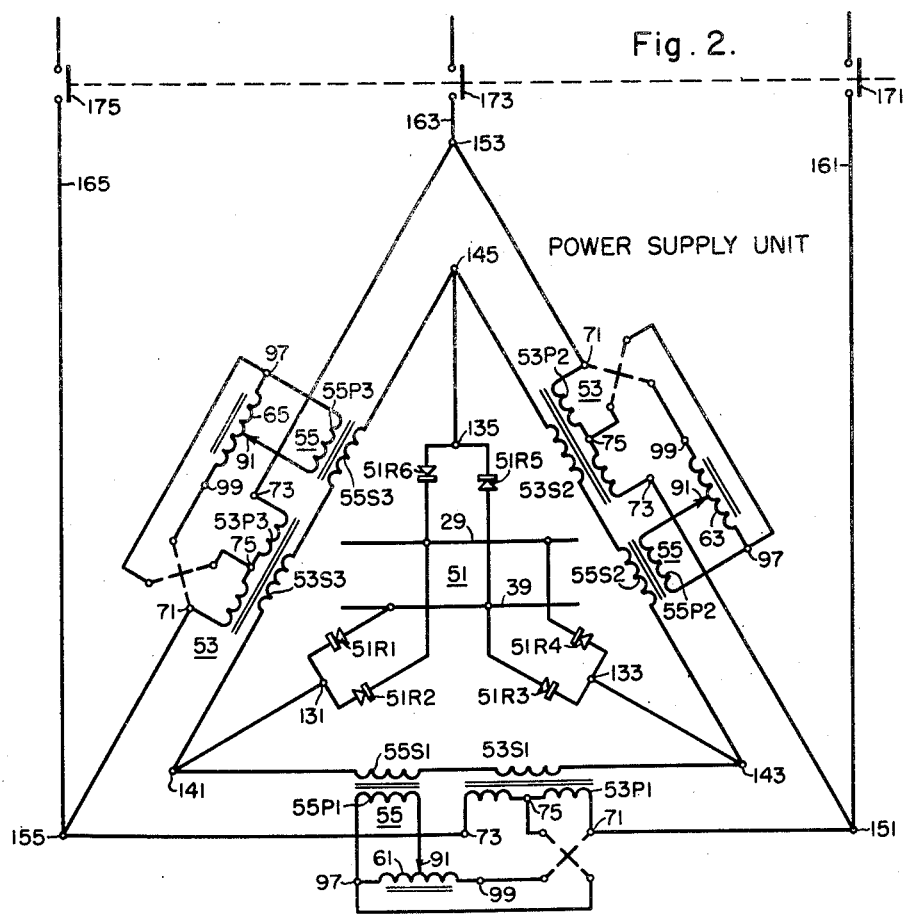
Fig. 2 is a circuit diagram of the embodiment shown in Fig. 1 which shows the relationship between the various windings of the transformer and the supply potentials impressed.
Figure 4:
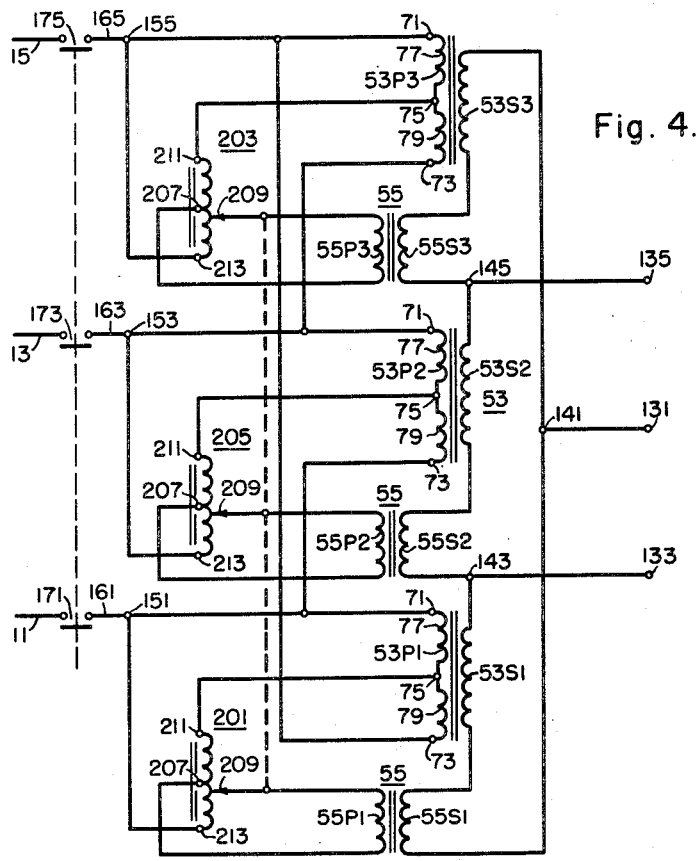
Fig. 4 is a circuit diagram showing a modification of my invention.

The apparatus shown in Fig. 4 differs from the apparatus shown in Figs. 1 through 3 only in the fact that it includes variable transformers 201, 203, 205 of the type having a fixed intermediate connection 207 in addition to the adjustable slider 209. Such variation transformers permit the elimination of the reversible switches 67, 69 and 71 of Fig. 1.

In the Fig. 4 modification, the terminal connections 211 and 213 of the variable transformers are each connected between an intermediate tap 75 and a terminal tap 75 of a section 77 of a corresponding primary phase winding 53P1, 53P2, 53P3 and each of the associated primaries 55P1, 55P2, 55P3 of the booster transformer is connected between the adjustable slider 209 and the intermediate connection 207. The potential existing across each of the secondaries 55S1, 55S2, 55S3 of the booster transformer is dependent in magnitude on the number of turns between the slider 209 and the intermediate terminal 207 and in polarity on the position of the slider relative to the intermediate terminal. Thus, the potential available across each series network consisting of a secondary phase winding 53S1, 53S2, 53S3 and a secondary 55S1, 55S2, 55S3 of the associated booster transformer is variable over a range similar to the range afforded by the Fig. 1 apparatus. It is essential in the case of Fig. 4 also that the voltage impressed through the variable transformers 201, 203, 205 shall be continuously variable from a low magnitude to a high magnitude.

While I have shown and described certain specific embodiments of my invention, many modifications thereof are possible. My invention, therefore, is not to be restricted except insofar as is necessitated by the prior art.

I claim as my invention:

1. Apparatus for welding with an arc between an electrode and work including in combination an electrode conductor, a work conductor, a polyphase transformer having a primary phase winding and a corresponding secondary phase winding for each of its phases, a variable transformer, the turn ratio of which is capable of continuous variation from a maximum magnitude to a minimum magnitude, associated with each phase of said source, each said variable transformer having fixed terminals and an adjusting slider movable between said fixed terminals, a reversing switch means associated with each phase of said source and having an actuating mechanism, a booster transformer primary winding and a booster transformer secondary winding associated with each phase of said source, means connecting in a series loop at least a portion of each said primary phase winding, the associated reversing switch and the fixed terminals of the associated variable transformer, means connecting in a series loop a booster primary winding and the adjustable slider and one of the fixed terminals of the associated variable transformer, means connecting in series in a delta network the secondary phase windings and the secondary booster transformer windings, means mechanically coupling said adjustable sliders to move together, means mechanically coupling the arms of said reversing switches to move together, rectifier means, and means connecting said rectifier means between said electrode and work conductors so that said rectifier means is capable of delivering direct current through said conductors.

2. Apparatus for welding with an arc between an electrode and work including in combination an electrode conductor, a work conductor, a polyphase supply transformer having a primary phase winding and a secondary phase winding for each of its phases, a booster transformer primary winding and a booster transformer secondary winding associated with each phase of said supply transformer, means connecting in series in a polygonal network said secondary phase windings and the booster secondary windings, a rectifier means, and means connecting said rectifier means between said network and said electrode and work conductors, the said apparatus being characterized by a variable transformer associated with each phase of said supply transformer, each said variable transformer having input terminals and output terminals and the number of its turns between the output terminals being variable continuously from a maximum magnitude to a minimum magnitude, said apparatus being also characterized by a reversing switch means associated with each phase of said supply transformer, by means connecting the input terminals of each said variable transformer to its associated primary phase winding through the associated switch means, by means connecting the output terminals of each variable transformer across the associated booster primary winding, by means for setting all said variable transformers together and by means for actuating all said switch means together.

3. Apparatus according to claim 2 characterized by a plurality of phase conductors for supplying power from a polyphase source, by contactor means for connecting said phase conductors to the primary phase windings and by means connected to be energized from a pair of said phase conductors for actuating said contactor means.

4. Apparatus according to claim 2 characterized by means connecting the primary phase windings in a polygonal network, by a plurality of phase conductors for deriving power from a polyphase source, by a contactor means interposed between each phase conductor and a corresponding apex of said network, and by means connected to be energized from a pair of said phase conductors for actuating said contactor means.

5. In combination a polyphase supply transformer having a primary phase winding and a secondary phase winding for each of its phases, a booster transformer primary winding and a booster transformer secondary winding associated with each phase of said supply transformer, a variable transformer capable of continuous variation from a maximum magnitude to a minimum magnitude associated with each phase of said transformer, each said variable transformer having first terminals between which the number of turns remains fixed and second terminals between which the number of turns is variable, a reversing switch means associated with each phase of said supply transformer, means connecting said secondary phase windings and said booster secondary windings in series in a polygonal network, means connecting each of said primary phase windings to one said set of terminals of the associated variable transformer through the associated reversing switch means, means connecting the other said set of terminals of each said variable transformer across the associated booster primary winding, rectifier means, and means connecting the apices of said network to said rectifier means.

6. Apparatus for welding with an arc between an electrode and work including in combination an electrode conductor, a work conductor, a polyphase supply transformer having a primary phase winding and a secondary phase winding for each of its phases, a booster transformer primary winding and a booster transformer secondary winding associated with each phase of said supply transformer, means connecting each secondary phase winding and the associated booster secondary winding in a series network, a rectifier means, and means connecting said rectifier means between said series networks and said electrode and work conductors, the said apparatus being characterized by a variable transformer associated with each phase of said supply transformer, each said variable transformer having input terminals and output terminals and the number of its turns between the output terminals being variable continuously from a maximum magnitude to a minimum magnitude, by a reversing switch means associated with each phase of said supply transformer, by means connecting the input terminals of each said variable transformer to its associated primary phase winding through the associated switch means, by means connecting the output terminals of each variable transformer across the associated booster primary winding, by means for setting all said variable transformers together and by means for actuating all said switch means together.

7. In combination a polyphase supply transformer having a primary phase winding and a secondary phase winding for each of its phases, a booster transformer primary winding and a booster transformer secondary winding associated with each phase of said supply transformer, a variable transformer capable of continuous variation from a maximum magnitude to a minimum magnitude associated with each phase of said transformer, each said variable transformer having first terminals between which the number of turns remains fixed and second terminals between which the number of turns is variable, a reversing switch means associated with each phase of said transformer, means connecting each secondary phase winding and the associated booster secondary in a series network, means connecting each of said primary phase windings to one set of terminals of the associated variable transformer through the associated reversing switch means, means connecting the other set of terminals of each said variable transformer across the associated booster primary winding, rectifier means, and means connecting said series networks to said rectifier means.

8. Apparatus according to claim 2 for welding in an inert gas atmosphere characterized by the fact that the polyphase transformer, the booster transformer windings and the variable reactor are so wound that, the direct current potential impressed between the electrode and work conductors when the apparatus is energized lies between approximately 15 volts and approximately 40 volts.

9. Apparatus according to claim 8 characterized by a polyphase transformer and booster transformer windings of low impedance.

10. Apparatus for welding by means of an arc between an electrode and work including in combination an electrode conductor, a work conductor, a polyphase supply transformer having a primary phase winding and a secondary phase winding for each of its phases, a booster transformer primary winding and a booster transformer secondary winding associated with each phase of said supply transformer, means connecting in series in a polygonal network said secondary phase windings and the booster secondary windings, a rectifier means, and means connecting said rectifier means between said network and said electrode and work conductors, the said apparatus being characterized by a variable transformer associated with each phase of said supply transformer, each said variable transformer having input terminals and output terminals and the number of its turns between the output terminals being variable continuously from a maximum magnitude to a minimum magnitude, said apparatus being also characterized by means connecting the input terminals of each said variable transformer to its associated primary phase winding, by means connecting the output terminals of each variable transformer across the associated booster primary winding, and by means for setting all said variable transformers together.

11. Apparatus according to claim 10 characterized by variable transformers each having a pair of end connections, an intermediate connection and an adjustable connection, the input terminals of said variable transformer being the end connections and the output terminals being the intermediate connection and the adjustable connection.

12. Apparatus for welding with an arc between parts to be welded including conductors for supplying welding current to the parts, low impedance power conversion means having input terminals adapted to be connected to power supply conductors and output terminals, said conversion apparatus including continuously-variable, variable transformer means connected between said input terminals and said output terminals for varying the potential at said output terminals with a given potential between said input terminals, and means connecting said output terminals to said welding current supply conductors, the said apparatus being characterized by the fact that the variable transformer means is so connected between said input terminals and said output terminals that the potential at said output terminals is variable continuously over the whole range of said variable transformer means whereby the variation over the whole range may be effected under load, the connection of the variable transformer between the input and the output terminals being such that the potential of said variable transformer may be impressed between said output terminals selectively either as a bucking or a boosting potential component.

13. Apparatus for welding with an arc between parts to be welded from a direct current supply having an open circuit voltage of between about 15 and about 40 comprising in combination conductors to be connected to said parts for conducting welding current to said parts, a polyphase transformer having windings each having connections between which a voltage of 220 R. M. S. is derivable, a plurality of variable transformers corresponding in number to the phases of said polyphase transformer and each having input and output terminals, means connecting said input terminals of each variable transformer to said connections of a corresponding primary winding, booster transformer primary winding means corresponding in number to the phases of said polyphase transformer, a booster-transformer secondary winding means coupled to each of said booster transformer primary winding means, rectifier means, means connecting each said booster transformer primary winding means to the output terminals of a corresponding variable transformer, and means connecting said booster transformer secondary winding means in circuit with said windings of said polyphase transformer, said rectifier and said conductors so as to deliver a direct current voltage variable continuously from 15 to 40 between said conductors.

14. Arc welding apparatus according to claim 10 characterized by a polyphase supply transformer across each secondary of which a potential of the order of 21 volts R. M. S. appears when a potential of the order of 220 volts R. M. S. is impressed across each primary and by variable-transformer booster-transformer combinations such that when the variable transformer is set for its maximum output the potential of the secondary of each booster transformer is of the order of 10 volts R. M. S.

15. Apparatus for welding by means of an arc between an electrode and work including in combination an electrode conductor, a work conductor, a polyphase supply transformer having a primary phase winding and a secondary phase winding for each of its phases, a booster transformer primary winding and a booster transformer secondary winding associated with each phase of said supply transformer, means connecting in series in a polygonal network said secondary phase windings and the booster secondary windings, a rectifier means, and means connecting said rectifier means between said network and said electrode and work conductors, the said apparatus being characterized by a variable transformer associated with each phase of said supply transformer, each said variable transformer having input terminals and output terminals and means for varying the potential between said output terminals for a given potential between said input terminals continuously from a maximum magnitude to a minimum magnitude, said apparatus being also characterized by means connecting the input terminals of each said variable transformers to its associated primary phase winding, by means connecting the output terminals of each variable transformer across the associated booster primary winding, and by means for setting all said variable transformers together.

16. Apparatus for welding with an arc between parts to be welded including conductors for supplying welding current to the parts, low impedance power conversion means having input terminals adapted to be connected to power supply conductors and output terminals, and low impedance rectifier means to which said output terminals are connected to derive direct current, said conversion apparatus also including continuously-variable, variable transformer means connected between said input terminals and said rectifier means for varying the potential at said output terminals with a given potential between said input terminals, and means connecting said output terminals to said welding current supply conductors, the said apparatus being characterized by the fact that the variable transformer means is so connected between said input terminals and said output terminals that the potential at said output terminals is variable continuously over the whole range of said variable transformer means whereby the variation over the whole range may be effected under load, the connection of the variable transformer between the input and the output terminals being such that the potential of said variable transformer may be impressed between said output terminals selectively either as a bucking or a boosting potential component.

References Cited in the file of this patent

UNITED STATES PATENTS

| | | |
|---|---|---|
| 1,453,491 | Champlin | May 1, 1923 |
| 1,620,619 | Currier | Mar. 8, 1927 |
| 2,567,476 | Hamilton | Sept. 11, 1951 |
| 2,644,109 | Mulden | June 30, 1953 |

FOREIGN PATENTS

| | | |
|---|---|---|
| 484,683 | Germany | Oct. 26, 1929 |
| 858,279 | Germany | Dec. 4, 1952 |
| 881,091 | Germany | June 25, 1953 |
| 896,099 | Germany | Nov. 9, 1953 |
| 857,947 | France | Apr. 29, 1940 |